United States Patent [19]
Spiess

[11] 3,722,066
[45] Mar. 27, 1973

[54] APPARATUS AND METHOD FOR ASSEMBLING UNIVERSAL JOINTS

[75] Inventor: Karl Spiess, Herzogenaurach, Germany

[73] Assignee: Industriewerk Schaeffer OHG, Herzogenaurach, Germany

[22] Filed: Aug. 4, 1971

[21] Appl. No.: 168,970

[30] Foreign Application Priority Data

Aug. 13, 1970   Germany.....................P 20 40 245.3

[52] U.S. Cl. .........................29/271, 29/434, 29/468
[51] Int. Cl. .............................................B25b 27/14
[58] Field of Search........29/430, 434, 271, 248, 464, 29/200 H, 200 P, 406, 468, 436–438, 201, 148.4 A, 33 K; 74/713; 82/45; 227/143, 144; 81/302, 418; 72/409

[56] References Cited

UNITED STATES PATENTS

| | | | |
|---|---|---|---|
| 3,290,754 | 12/1966 | Pitner | 29/434 |
| 3,429,021 | 2/1969 | Spiess | 29/434 |
| 3,656,679 | 4/1972 | Minasy | 227/144 |
| 3,250,450 | 5/1966 | Page et al. | 227/144 |
| 3,145,388 | 8/1964 | Carpinella | 227/143 |
| 1,153,789 | 9/1915 | Hopkins | 29/434 |
| 3,230,617 | 1/1966 | Spiess | 29/434 |
| 3,447,232 | 6/1969 | Stillwagon | 29/434 |
| 3,517,433 | 6/1970 | Pitner | 29/434 |
| 3,529,942 | 9/1970 | Pitner | 29/434 |

Primary Examiner—Charles W. Lanham
Assistant Examiner—D. C. Crane
Attorney—Hammond & Littell

[57] ABSTRACT

A device for centering the spider trunnions in the eyes of the corresponding fork arms during the assembling of universal joints, said device comprising a pair of oppositely disposed holding members which extend from the outside into each of the annular spaces defined by the circumferential wall of the eye and the outer surface of the spider trunnions inserted therein and thereby center and hold a pair of spider trunnions in centered position within the eyes; and a process for assembling universal joints which comprises the steps of inserting the four spider trunnions into the respective fork eyes, centering a pair of oppositely disposed trunnions in the corresponding eyes with the aid of said centering device, clamping the other pair of trunnions in place, removing the centering device and mounting the roller bearings in the spaced between the eyes and the trunnions centered therein, removing the clamps from the other trunnion pair and mounting the roller bearings in the spaces between the eyes and the said other trunnions.

5 Claims, 5 Drawing Figures

Inventor:
KARL SPIESS

APPARATUS AND METHOD FOR ASSEMBLING UNIVERSAL JOINTS

This invention relates to an apparatus for centering the spider trunnions in the eyes of the fork arms of a universal joint, as well as to a method of assembling universal joints with the aid of this centering device.

BACKGROUND OF THE INVENTION

In the course of assembling universal joints, the two fork elements and the spider element must be aligned with respect to each other to make it possible to press in the roller bearings without damaging the same. This requirement necessitates the maintenance of very narrow tolerances in the manufacture of the fork elements and the spider, and the accurate alignment of the individual parts with respect to each other is a complicated and time-consuming procedure.

OBJECTS OF THE INVENTION

It is an object of the present invention to provide a device for centering the spider trunnions of a universal joint in the eyes of the corresponding fork arms preparatory to and during insertion of the roller bearings, which simplifies and accelerates the assembly of universal joints.

Another object of the present invention is to provide a simplified and less time-consuming method of assembling universal joints.

Other objects and advantages of the invention will become apparent as the description thereof proceeds.

THE INVENTION

The above objects are achieved in accordance with the present invention by a centering device which consists, in principle, of a pair of holding members which extend from the outside into the annular space between the circumferential walls of the eyes in the fork arms and the spider trunnions, and accurately center the trunnions in the eyes preparatory to and during the insertion of the roller bearings.

The centering device in accordance with the present invention may be built into an assembling machine for universal joints and, depending upon the operating manner of the machine, either simultaneously center and position all four of the spider trunnions in the fork eyes, or center and position only two oppositely extending trunnions at a time in the corresponding fork eyes.

In accordance with one embodiment of the invention, the centering device may also be hand-operated and be constructed in the manner of pliers in that it comprises a pair of holding members which are longitudinally slidable with respect to each other and function to center and hold the two oppositely extending spider trunnions in the eyes of fork members of the universal joint assembly. Such a centering pliers makes it possible to center a pair of oppositely extending spider trunnions in the corresponding fork eyes by hand outside the assembling machine itself, whereby the cycle periods of the machine are substantially shortened since, during the operating cycle of the assembling machine, the next fork element can already be provided with a spider and the latter centered in the eyes. Moreover, the use of the hand-operated centering device, enables the assembling machine and its operating controls to be constructed in relatively simple fashion.

One embodiment of the centering pliers provides for the inclusion of stops at a fixed distance from the common axis of the two holding members. These stops serve to align the fork member with the spider and the centering pliers in the assembling machine.

The present invention further provides a process for assembling universal joints, using the above-described centering device, in which the four trunnions of a universal joint spider are journaled in the eyes of the corresponding fork members by means of roller bearings. The process according to the present invention comprises the following steps:

The four trunnions of a universal joint spider are first inserted into the eyes located in the fork arms of the two fork members, and then centered and held in the centered position in the eyes by means of centering devices of the character described. The centering devices are preferably built into the universal joint assembling machine and operate semi-automatically or fully automatically.

The spider is now fixed in position by clamping on two oppositely extending trunnions, and the centering device is removed from the other two spider trunnions. At this time a pair of roller bearings is moved in front of and into alignment with each of the two free centered trunnions, simultaneously pressed into the respective annular space between the trunnion and the wall of the eye in the fork member, and fixed in position. Subsequently, the centering devices are removed from the other two trunnions, and a second pair of roller bearings is positioned in front of and in alignment with each eye, simultaneously pressed into the annular space and fixed therein.

Of course, it is also within the scope of the present invention if not all four spider trunnions are simultaneously centered in the eyes of the fork members, but only one pair of trunnions at a time. This separate centering procedure may be effected by means of a centering device built into a universal joint assembling machine or also outside of the machine with the aid of hand-operated centering pliers.

When manually operated centering pliers are employed, the universal joint assembling process according to the present invention proceeds as follows:

Two oppositely positioned trunnions of the spider element are inserted into the corresponding eyes of one fork element and centered and held therein by the holding members of the said centering pliers. This process step is performed outside of the assembling machine proper.

The first fork element, together with the spider and the said centering pliers, is now inserted into a first gripping device wherein the two free trunnions of the spider are seated in recesses arranged at right angles to the common axis of the pressure insertion dies, whereby the two spider trunnions held in place by the centering pliers are brought into true angular alignment with the common axis of the two dies. The recesses for the free pair of spider trunnions are located in centering elements. The horizontal alignment of the said axes results by virtue of the centric and right-angle position of the gripping device for the fork element and through the centering pliers and an elevation stop.

The first fork element is fixed in this position, spider is clamped at its two free trunnions, and the centering pliers is removed. The spider is now centered in the fork eyes through one pair of its trunnions.

At this point, a roller bearing is moved in front of and into alignment with each of the eyes of the first fork element, pressed into the respective annular spaces between the trunnions and the wall of the eyes, and fixed in place. The insertion and fixing of the roller bearings may be performed by any desired known method.

The next process step consists of inserting the the two free spider trunnions into the eyes of the second for element, and centering and holding them therein by means of the said centering pliers. This process step is again performed outside of the assembling machine proper.

Subsequently, the two fork elements, together with the said centering pliers, are inserted into a second gripping device wherein the stops of the centering pliers are seated in recesses arranged along an axis parallel to the common axis of a pair of pressure insertion dies, in order to bring the two spider trunnions held by the centering pliers into true angular alignment with the common axis of the insertion dies. The stops of the centering pliers may also be constructed in a manner such that they simultaneously serve to fix the elevation and horizontal alignment of the axis of the said trunnion pair relative to the common axis of the two insertion dies.

However, it is also possible to fix the elevation and alignment of the axis of said trunnion pair by means of the length of one fork element and its gripping device and through co-action with a corresponding stop surface in the assembling machine.

The two unassembled fork elements are clamped in the described position by a second gripping device, and the centering pliers are then removed. The spider is held in proper position by the roller bearings of the already assembled first trunnion-fork pair unit. Subsequently, the second trunnion-fork pair unit is assembled by moving a roller bearing in front of and into alignment with each of the eyes, pressing the bearings into the respective annular spaces and fixing them therein, as described above.

The advantage of the manually operated centering pliers resides in that this centering device is of relatively simple construction and, moreover, it allows the assembling machine to operate with a very short cycle period because, while the assembling machine inserts the roller bearings into one fork element, the next fork element can already be prepared for assembly outside the machine.

The apparatus and process according to the present invention shall now be further illustrated and explained with the aid of the manually operated centering pliers embodiment and with reference to the attached drawings, of which FIG. 1 shows a preferred embodiment of a centering pliers according to the present invention;

Figure 1:
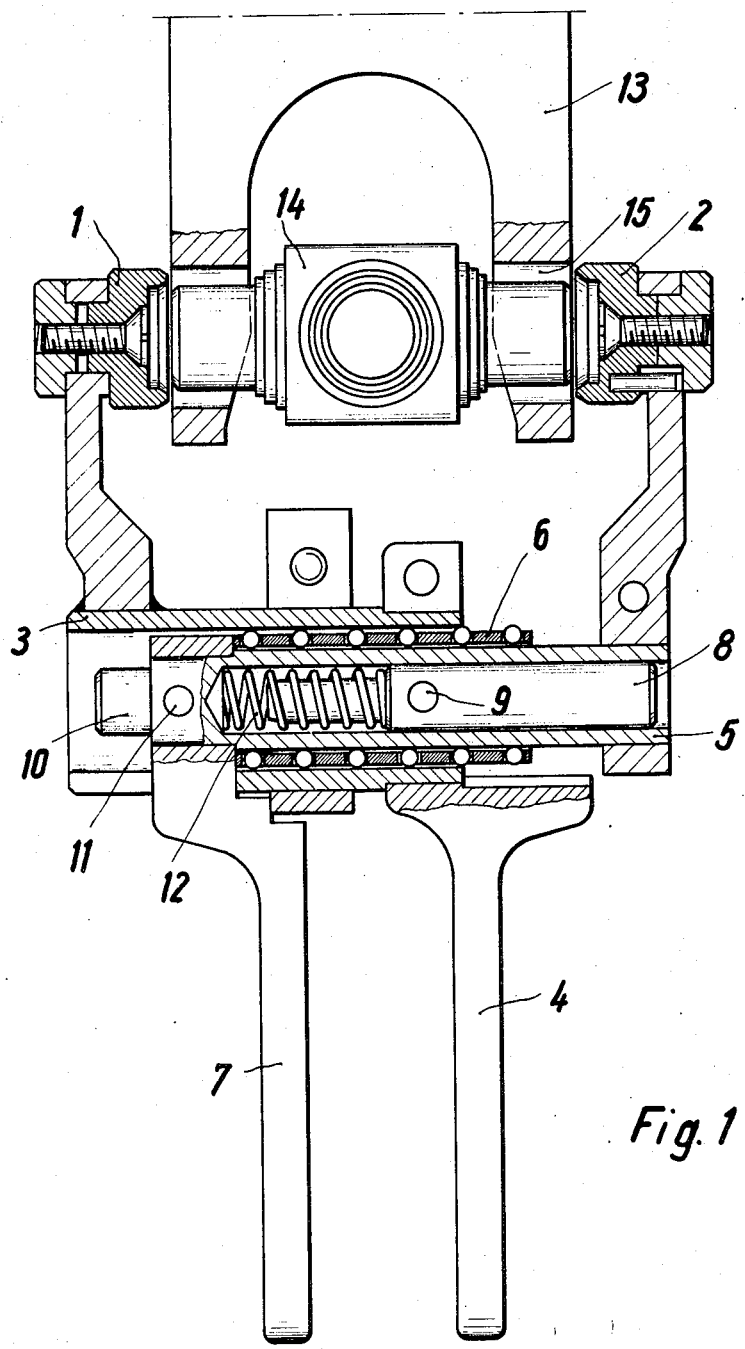

Referring to FIG. 1, the centering pliers consist of two holding members 1 and 2. The left holding member 1 is rigidly connected with the right handle 4 by way of the outer hollow cylindrical element 3. An inner hollow cylindrical member 5 is mounted for longitudinal sliding action within the outer cylindrical member 3 by means of roller bearing 6. The inner cylindrical member 5 is rigidly connected with the right holding member 2 and with the left handle 7. A bolt 8 is slidably mounted within cylindrical member 5, said bolt being rigidly connected with handle 4 by means of pin 9 and thus with outer cylindrical member 3. Another bolt 10 is rigidly connected with handle 7 by means of pin 11 and thus with inner cylindrical member 5. A spring 12 is mounted within cylindrical member 5 so that it forces handles 4 and 7 apart, while pressing holding members 1 and 2 toward each other.

The oppositely extending trunnions of spider 14 are inserted into the eyes of the two arms of fork 13. In the position of the centering pliers shown in FiG. 1 the handles 4 and 7 are pressed together in opposition to the spreading force of spring 12, whereby holding members 1 and 2 are spread apart. In this position the holding members 1 and 2 of the centering pliers are positioned from the outside in front of the fork eyes, and handles 4 and 7 are released. The force of spring 12 moves holding members 1 and 2 toward each other and causes the same to seat themselves in the annular spaces 15 between the wall of the eyes and the spider trunnion, whereby the trunnions are held in position and centered within the eyes.

Figure 2:
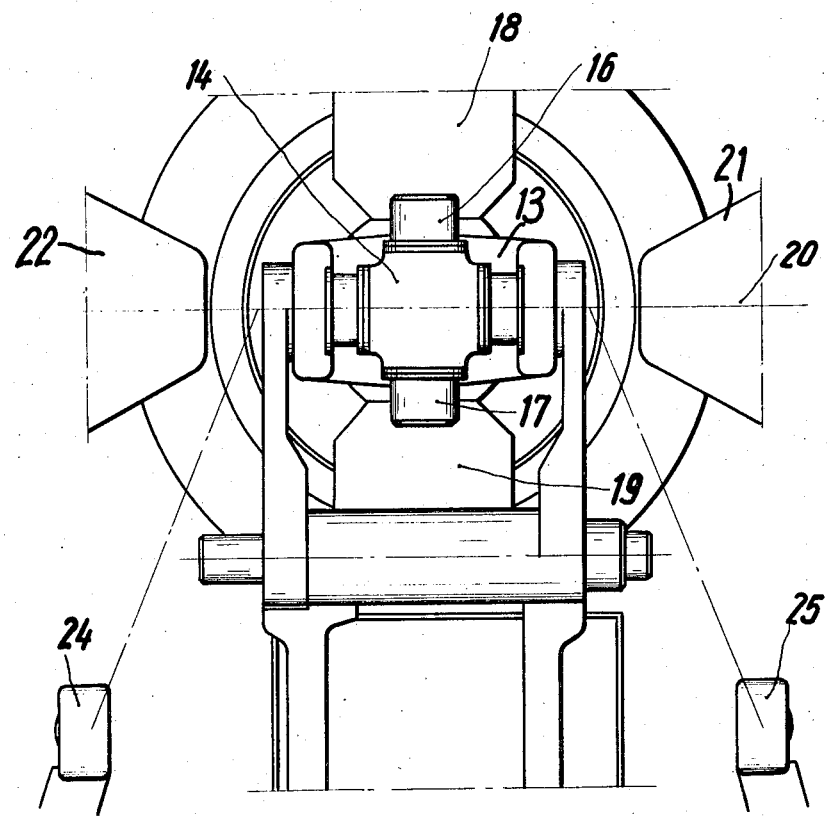
FIG. 2 is a schematic representation of the first step of the assembling process of the instant invention.
Figure 3:
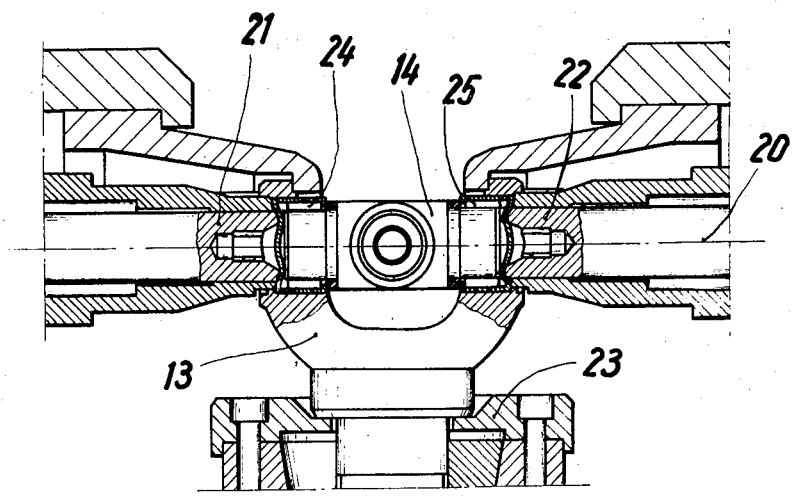
FIG. 3 illustrates the insertion of the roller bearings in association with the first pair of trunnions of the spider.

FIG. 2 shows how the fork and the spider 14, held in place by the centering pliers, are inserted into the first gripping device. The two free trunnions 16 and 17 of spider 14 are seated in centering members 18 and 19, whereby the trunnions of spider 14 being held by the centering pliers are brought into true angular alignment with the common axis 20 of two bearing insertion rams 21 and 22. The horizontal alignment of the spider trunnions with axis 20 results from the centered and right-angle gripping of fork element 13 by way of the centering pliers and an elevation stop (not shown). Fork element 13 is then fixed in this position at its associated shaft by means of gripping device 23 (see FIG. 3). Spider 14 is clamped in position by centering members 18 and 19. The centering pliers is now removed, two roller bearings 24 and 25 are brought into alignment with the fork eyes, inserted into annular spaces 15 (see FIG. 1) by insertion rams 21 and 22, and fixed therein by any desired conventional means. The first assembling step is now completed.

Figure 4:
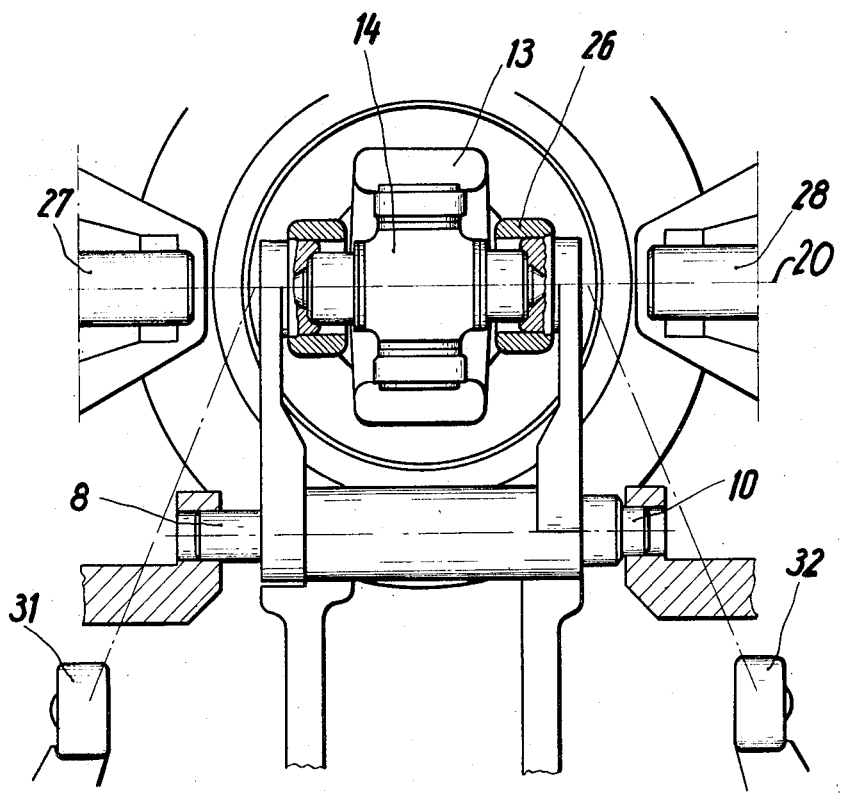
FIG. 4 is a schematic representation of the second process step.

FIG. 4 shows how the partially assembled universal joint is inserted into the second gripping device. The roller bearings and one pair of spider trunnions have already been assembled with fork 13 in the first process step. The two still free trunnions of spider 14 are held and centered in the eyes of fork 26 by the centering pliers. Bolts 8 and 10 of the centering pliers are seated in corresponding recesses of a second gripping device, said recesses being concentrically arranged on an axis parallel to the common axis of the two bearing insertion rams 27 and 28, whereby the axis of the free pair of trunnions of spider 14 are brought into true angular alignment with the common axis of insertion rams 27 and 28. The horizontal alignment of the spider trunnions with axis 20 results from the centered and right angle clamping of fork 13 by way of the centering pliers and an elevation stop (not shown).

Figure 5:
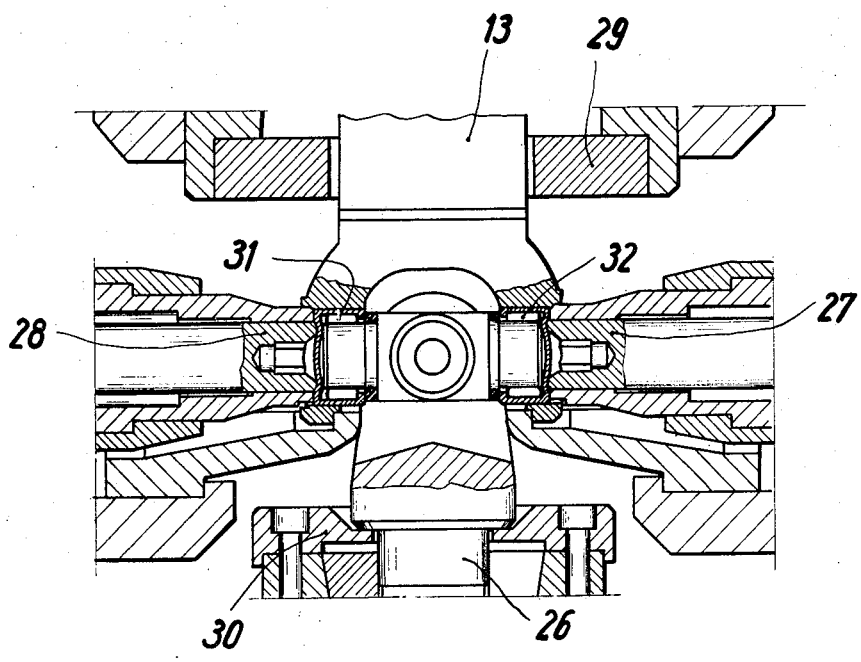
FIG. 5 illustrates the insertion of the roller bearings in association with the second pair of spider trunnions.

Referring now to FIG. 5, the two fork elements 13 and 26 are gripped on their respective shafts by gripping devices 29 and 30, and the centering pliers are then removed. Two roller bearings 31 and 32 are brought into alignment with the eyes of the second fork element 26, inserted into the respective annular spaces by insertion rams 27 and 28, and fixed therein by any desired known means.

The completely assembled universal joint may now be removed from the second gripping device.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

I claim:

1. A device for centering the spider trunnions in the corresponding eyes of the fork members of a universal joint, said device comprising a pair of holding members which extend from the outside into the space between the walls of the eyes and the spider trunnions to center the spider trunnions in the eyes.

2. A centering device according to claim 1, which is constructed in the form of pliers and comprises two holding members which are longitudinally slidably guided for movement toward each other, each of which centers and supports one of two oppositely disposed spider trunnions in the eye of the associated fork member.

3. A centering device according to claim 2, wherein a pair of stops is arranged at a fixed distance from the common axis of the two holding members.

4. In a process of assembling a universal joint, in which the four spider trunnions are journaled with the aid of anti-friction bearings in the eyes of the corresponding fork members, the steps of
   a. inserting the four spider trunnions into the eyes of the corresponding fork members and centering a first pair of trunnions in the eyes associated therewith by applying a centering device thereto,
   b. clamping the second pair of spider trunnions in place with a clamping device and removing the centering device from the first pair of trunnions,
   c. inserting and anti-friction bearing into each annular space between each of said first pair of trunnions and the wall of the eye associated therewith, and fixing said bearings in place,
   d. removing the clamping device from the second pair of spider trunnions, and
   e. inserting and anti-friction bearing into each annular space between each of said second pair of trunnions and the wall of the eye associated therewith, and fixing said bearings in place.

5. In a process of assembling a universal joint according to claim 4, the steps of
   a. inserting a first pair of oppositely extending spider trunnions into the eyes of the corresponding first fork members and centering said first pair of trunnions in the eyes associated therewith by applying a centering pliers thereto,
   b. inserting the first fork members, together with the spider and the centering pliers, into a first clamping device and seating the free ends of the second pair of oppositely extending spider trunnions in a pair of recesses arranged at right angles to the common axis of a first pair of bearing insertion rams, whereby the first pair of spider trunnions held by said centering pliers are brought into true angular alignment with the common axis of said first pair of bearing insertion rams,
   c. clamping the first fork members and the second pair of spider trunnions in place with said first clamping device and removing the centering pliers from the first pair of spider trunnions,
   d. inserting an anti-friction bearing into each annular space between each of said first spider trunnions and the wall of the eye associated therewith, fixing said bearings in place and removing said first clamping device,
   e. inserting the second pair of oppositely extending spider trunnions into the eyes of the corresponding second fork members and centering said second pair of trunnions in the eyes associated therewith by applying said centering device thereto,
   f. inserting the first and second fork members, together with the spider and the centering pliers, into a second clamping device and seating the spreading stops of said centering pliers in recesses arranged on a common axis parallel to the common axis of a second pair of bearing insertion rams, whereby the second pair of spider trunnions held by said centering pliers are brought into true angular alignment with the common axis of said second pair of bearing insertion rams,
   g. clamping the second fork members in place with said second clamping device and removing said centering pliers, and
   h. inserting an anti-friction bearing into each annular space between each of said second spider trunnions and the wall of the eye associated therewith, fixing said bearings in place and removing said second clamping device.

* * * * *